3,284,423
PRESSURE-SENSITIVE CREEP-RESISTANT
RESIN COMPOSITION
Edmund C. Knapp, Wilbraham, Mass., assignor, by mesne assignments, to Monsanto Company, a corporation of Delaware
No Drawing. Filed Dec. 20, 1963, Ser. No. 332,281
8 Claims. (Cl. 260—80.5)

This invention relates to new polymeric materials. More particularly, it relates to new vinyl type copolymers capable of self-curing at room temperature to tacky, flexible and water-resistant films possessing good resistance to shear forces at elevated temperatures and having good adhesion to a variety of substances generally considered difficult to bond. Still more particularly, the invention relates to copolymers of a lower alkyl ester of acrylic or methacrylic acid with another ethylenically unsaturated ester monomer having more than 6 carbon atoms per molecule, a glycidyl ester of an ethylenically unsaturated monocarboxylic or dicarboxylic acid, and an acrylic compound containing a group capable of reacting with the epoxide structure of the glycidyl ester.

To one skilled in the art, there are many ways known to produce a resin coating that is pressure-sensitive. It can be done, for example, by the use of tackifying plasticizers, by combining monomers such that the resulting polymer is internally plasticized, or by using such combinations of polymers that will impart the desired surface tack to the resin blend. It is unfortunate however that the pressure-sensitive resins prepared by the above or by related techniques are given to creep when subjected to loads for prolonged periods at room temperature or at slightly higher temperatures. Such resins thus have excellent adhesion but they suffer from poor cohesion.

The art of course does provide several techniques for the improvement of cohesive strength in a resin. It may be done, for instance, by increasing the molecular weight of the resin. A comonomer composition may be used that will harden the resin. Or a blend of resins may be compounded that will yield harder finished materials. Cross-linking also may be resorted to in order to improve cohesion. Again unfortunately, it is often necessary to employ all of these techniques to achieve what is a rather delicate balance of properties for any given application, this because of the weakening, if not the complete destruction, of the pressure-sensitive characteristics of the resin when it is altered by harder resins or monomers or crosslinked by difunctional compounds. Gains in cohesion thus are usually accomplished at the expense of pressure sensitivity.

It is therefore the principal object of this invention to provide a composition of matter in which the desirable property of pressure sensitivity is combined with the desirable cohesive strength necessary to extend the range of usable temperature conditions for resins of this type so that it includes temperatures significantly higher than those under which other resins can currently function. It is another object of this invention to provide a stable adhesive preparation that is capable of self-cure at room temperature after application to a substrate. A further object is to provide a resin which will retain its pressure sensitivity after it has undergone crosslinking.

These and other objects will will become evident in the course of the following description of the invention have been accomplished by the incorporation of an epoxide-containing monomer and of another polymerizable compound containing labile hydrogen into a comonomer composition capable of providing the basic properties required of the finished resin, e.g. permanent tackiness. The monomer mixture is then polymerized in solution or in emulsion so that the polymer obtained remains at all times until application in a dispersed phase. When the resin product is coated onto a substrate and dried, it crosslinks at room temperature, or more rapidly at higher temperatures, thus increasing its cohesive strength. This increase in cohesive strength surpasses that which can be accomplished by a mere increase of the average molecular weight of the resin solution and it avoids, at the same time, the excessive viscosities inherent in the latter approach.

The pressure-sensitive polymer of the invention is composed of the following monomers, on a weight percent basis:

(a) 35 to 75% of an ethylenically unsaturated ester monomer having more than 6 carbon atoms per molecule;

(b) 10 to 60% of a lower alkyl ester of an acrylic acid having not more than 4 carbon atoms in its acid moiety and not more than 2 carbon atoms in the alkyl group;

(c) 0.1 to 10% of a carboxyl group containing vinyl type monomer having labile hydrogen in the molecule; and (d) 0.1 to 10% of a glycidyl ester of an ethylenically unsaturated monocarboxylic or dicarboxylic acid. The first two types of monomers here provide the tacky pressure-sensitive resin while the last two supply the crosslinking members.

There are of course many compositions other than those included within the limits just mentioned that are pressure-sensitive, but what is particularly remarkable about the ones selected is that they alone, as intimated earlier, possess a high degree of dry tack that remains largely unaffected by the self-curing action of the resin.

The detail and manner of practicing the present invention will become apparent on reference to the following specific examples in which the parts given are by weight. It is understood that these examples are merely illustrative embodiments of the invention and that the scope of the invention is not limited thereto.

EXAMPLE 1

A solution of 2-ethylhexyl arcylate (60 parts), methyl arcylate (34 parts), acrylic acid (5 parts) and glycidyl methacrylate (1 part) was formed in a 4:1 ethyl acetate-hexane solvent mixture and polymerized at reflux temperature for 5 hours in the presence of 0.15 part of $\alpha,\alpha'$-azo-diisobutyronitrile. The resulting polymer solution had a solids content of 45% by weight and a Brookfield viscosity of 15,000 centiposes at 25° C. The product was stable for at least three months on storage at room temperature; no detectable increase in viscosity occurred during that time. Its relatively low solution viscosity at that solids level makes the product easy to use in laminating operations.

This particular pressure-sensitive resin when coated and dried could bond "Mylar" polyethylene terephthalate to steel under a constant shear load of 1 lb./square inch at 60° C. and resist creep indefinitely under such conditions. The resin exhibited aggressive dry tack which was not noticeably diminished after two weeks under the above test conditions. In contrast, the resin prepartion without the epoxide-acrylic acid crosslinking components failed under these test conditions only after a few hours even at temperatures as low as 32° C.

EXAMPLE 2

Another polymerization was carried out with the following monomer charge: 65 parts lauryl acrylate, 29 parts ethyl acrylate, 5 parts acrylic acid and 1 part glycidyl methacrylate. The process used was that of Example 1.
There was thus obtained a resin solution having a solids content of 55% by weight and a Brookfield viscosity of 10,000 centipoises at 25° C. The permanently tacky resin was found to be resistant, after self-cure, to shear creep when loaded at 1 lb./square inch at 32° C. for a period of well over 100 hours. In fact, it also resisted creep indefinitely at 60° C. when bonding steel to Mylar under the same load conditions.

EXAMPLE 3

Another resin was made according to the process of Example 1 from a monomer composition consisting of 64 parts 2-ethylhexyl acrylate, 30 parts ethyl acrylate, 5 parts acrylic acid and 1 part glycidyl methacrylate. A chain transfer agent, dodecanethiol was used to lower viscosity.

The resulting polymer solution had a solids content of 43% by weight and a Brookfield viscosity of 4,300 centipoises at 25° C. When used to bond steel to Mylar under a constant shear load of 1 lb./square inch, this polymeric adhesive also resisted creep indefinitely at 60° C.

The classes of monomers that can be used to form the adhesive resin compositions of this invention have already been broadly identified. Within these classes, there can be used in lieu of 2-ethylhexyl acrylate, such compounds as butyl acrylate, vinyl 2-ethylhexoate, di-2-ethylhexyl maleate, dibutyl maleate, hexyl acrylate, methacrylate esters such as the lauryl, 2-ethylhexyl, butyl and hexyl esters and so on. The methyl acrylate and the ethyl methacrylate used in the examples may be replaced by their ethyl and methyl homologs respectively. Methacrylic acid, crotonic acid, monomethyl maleate, itaconic acid, acrylamide, hydroxyethyl methacrylate and similar monomers can be used advantageously as active or labile hydrogen containing compounds. Any glycidyl ester of the ethylenically unsaturated acids will serve in the crosslinking function; these include such compounds as glycidyl acrylate, glycidyl crotonate, glycidyl methyl maleate, and so on.

The proportions of these monomers in the compositions of the invention have also been mentioned. It should be noted in this respect that in addition to the need to restrict the composition to these monomer ratios in order to obtain pressure-sensitive adhesives, other considerations render such limitations necessary.

The proportions of monomers to be used in order to obtain pressure-sensitive compositions that retain their tackiness after crosslinking have already been disclosed. As further support for some of these limits, it should be noted that the use of more than 70% by weight of 2-ethylhexyl arcrylate or an equivalent in a given composition leads to severe gellation problems with the appearance of "fish-eyes" in the solution and this whether the acid monomer and the glycidyl ester are present or not. Also, acrylic acid contents of 10% or higher will lower the hexane tolerance of the system.

Naturally within the limits already set, the actual composition of a given pressure-sensitive resin will depend to some extent on the monomers selected. If they be for instance those used in Example 1, the preferred limits within which the desirable properties of the composition will be maximized are as follows: 2-ethylhexyl acrylate, 50 to 70% by weight; methyl acrylate, 30 to 40%; acrylic acid, 3 to 6%; and glycidyl methacrylate, 1 to 3%.

The solids contents of the adhesive preparations of this invention should generally not exceed 47% by weight if the preparation is not to have excessive viscosity. In these respects, the preferred products are those ethyl acetate-hexane (5:1) solutions having a total solids contents of about 45% by weight and a viscosity within the range of about 10,000 to about 20,000 centipoises at 25° C. Furthermore, these resin solutions are compatible with many common organic solvents. For example, they may be diluted with equal volumes of the following solvents to give clear, useful solutions: acetone, butyl alcohol, 2-ethoxyethyl alcohol, 2-butoxyethyl alcohol, carbon tetrachloride, ethyl acetate, hexane, methyl alcohol, methyl isobutyl ketone, toluene, 1,1,1-trichloroethane, and so on.

The method of polymerization is not critical in that the process can be carried out in solution or in emulsion. Care should be taken however to keep the reaction temperature below the level at which the acid compound and the epoxide interact and cause gelation. The polymerization is preferably carried out by heating the monomers at 65 to 80° C. in the presence 0.1 to 0.5% of a catalyst, based on the weight of the monomer charge.

The catalysis of this polymerization can be done by compounds other than the $\alpha,\alpha'$-azo-diisobutyronitrile used in the examples. Addition polymerization catalysts are generally effective and these include peroxides, persulfates and azo compounds such as benzoyl peroxide, tertiary-butyl perbenzoate, potassium persulfate, dimethyl azo-bis-(isobutyrate) and azo-bis($\alpha$-methyl-capronitrile) to name a few.

The practice of this invention thus gives rise to adhesive resins which possess a very interesting combination of useful properties that has not yet been realized in any other product known to the art. The polymer solutions have remarkable stability; they contain groups capable of crosslinking and yet will not crosslink as long as solvent is present. They are self-curing at room temperature when dry. They retain their pressure-sensitive characteristic or tackiness even after cure. They show extreme resistance to shear and offer low resistance to peeling forces. Their bonds are not weakened upon immersion in water. Their usefulness with respect to creep resistance encompasses application temperature up to and including 60° C., as has been established by actual test, and perhaps higher ones yet.

Advantage can be taken of these excellent properties in applications as varied as contact adhesives, label adhesives for both internal and external use, pressure-sensitive tapes, laminating adhesives, stack-lock adhesives, etc. The materials of this invention show good adhesion to a wide variety of hard-to-glue substrates such as polyethylene terephthalate (Mylar), cellulose acetate, cellophane, polyvinyl chloride, polyvinylidene chloride and metal foils. They are unusually qualified as package-flap adhesives where high shear and low peel would be a unique combination of desirable properties. Viscosity stability and compatibility of the products with other resins and extenders are good thus rendering them available for compounding with other adhesives for many of the special applications that are so common to the trade.

Because of the changes and modifications that can be effected without departing from the spirit and nature of the invention, it is understood that said invention is not to be limited except by the appended claims.

What is claimed is:

1. A tacky and pressure-sensntive crosslinked adhesive copolymer consisting of (a) 35 to 75% by weight of acrylic acid esters having between 6 and 15 carbon atoms per-molecule, (b) 10 to 60% by weight of a lower alkyl acrylate taken from the group consisting of methyl acrylate and ethyl acrylate, (c) 0.1 to 10% by weight of an acid taken from the group consisting of acrylic acid, methacrylic acid, itaconic acid and crotonic acid, (d) 0.1 to 10% by weight of a glycidyl ester taken from the group consisting of glycidyl acrylate and glycidyl methacrylate.

2. A pressure-sensitive adhesive composition comprising the copolymer of claim 1.

3. The copolymer of claim 1 wherein the lower alkyl acrylate is methyl acrylate.

4. The copolymer of claim 1 wherein the weight of glycidyl ester is from 1.0 to 3% of glycidyl methacrylate.

5. The polymer of claim 1 wherein the acid is acrylic acid and glycidyl ester is glycidyl methacrylate.

6. A tacky and pressure-sensitive crosslinked adhesive composition which is the polymerization product of a mixture consisting of: 2-ethylhexyl acrylate, 50 to 64% by weight; methyl acrylate, 30 to 40%; acrylic acid, 3 to 6%; and glycidyl methacrylate, 1 to 3%.

7. The composition of claim 6 wherein the components of the mixture are 60%, 34%, 5% and 1% by weight respectively.

8. A process of preparing a pressure-sensitive copylmer capable of crosslinking at room temperature which comprises heating together at a temperature of from about 65° to 80° C. in the presence of from 0.1 to 0.5% of an addition free-radical polymerization catalyst, a mixture of (a) 35 to 75% by weight of acrylic acid ester having from 6 to 15 carbon atoms per molecule, (b) 10 to 60% of a lower alkyl acrylate taken from the group consisting of methyl acrylate and ethyl acrylate, (c) 0.1 to 10% by weight of an acid taken from the group consisting of acrylic acid, methacrylic acid, itaconic acid and crotonic acid, and (d) 0.1 to 10% by weight of a glycidyl ester taken from the group consisting of glycidyl acrylate and glycidol methacrylate, in an organic solvent solution containing not more than 47% by weight of the mixture.

References Cited by the Examiner
UNITED STATES PATENTS

| | | | |
|---|---|---|---|
| 2,973,286 | 2/1961 | Ulrich | 260—80.5 |
| 3,050,425 | 8/1962 | Carr et al. | 260—80.5 |
| 3,052,659 | 9/1962 | Woodruff | 260—80.5 |

JOSEPH L. SCHOFER, *Primary Examiner.*

H. WONG, *Assistant Examiner.*

DONALD E. CZAJA, *Examiner.*

Notice of Adverse Decisions in Interferences

In Interference No. 96,664 involving Patent No. 3,284,423, E. C. Knapp, PRESSURE-SENSITIVE CREEP-RESISTANT RESIN COMPOSITION, final judgment adverse to the patentee was rendered Mar. 16, 1970, as to claims 1, 2 and 8.

[*Official Gazette March 6, 1973.*]